United States Patent
Hasenzahl et al.

(10) Patent No.: US 8,012,367 B2
(45) Date of Patent: Sep. 6, 2011

(54) PULVERULENT MATERIALS

(75) Inventors: Steffen Hasenzahl, Hanau (DE); Claus-Peter Drexel, Neu-Isenberg (DE); Jürgen Meyer, Stockstadt (DE)

(73) Assignee: Evonik Degussa GmbH, Essen (DE)

( * ) Notice: Subject to any disclaimer, the term of this patent is extended or adjusted under 35 U.S.C. 154(b) by 703 days.

(21) Appl. No.: 10/532,202

(22) PCT Filed: Oct. 7, 2003

(86) PCT No.: PCT/EP03/11053
§ 371 (c)(1),
(2), (4) Date: Apr. 14, 2005

(87) PCT Pub. No.: WO2004/039485
PCT Pub. Date: May 13, 2004

(65) Prior Publication Data
US 2006/0017038 A1    Jan. 26, 2006

(30) Foreign Application Priority Data
Oct. 31, 2002 (DE) .................. 102 50 712

(51) Int. Cl.
*A62D 1/00* (2006.01)
*C09K 3/00* (2006.01)
*C01B 33/12* (2006.01)

(52) U.S. Cl. ........ 252/2; 252/182.11; 427/220; 423/325

(58) Field of Classification Search ................. 427/220; 252/2
See application file for complete search history.

(56) References Cited

U.S. PATENT DOCUMENTS

| 5,429,873 | A | * | 7/1995 | Deusser et al. | 428/405 |
| 5,665,156 | A | * | 9/1997 | Ettlinger et al. | 106/287.14 |
| 5,711,797 | A | * | 1/1998 | Ettlinger et al. | 106/287.14 |
| 5,928,723 | A | * | 7/1999 | Koehlert et al. | 427/213 |
| 5,959,005 | A |   | 9/1999 | Hartmann et al. | |
| 6,159,540 | A | * | 12/2000 | Menon et al. | 427/220 |
| 6,193,795 | B1 | * | 2/2001 | Nargiello et al. | 106/484 |
| 2002/0025563 | A1 | * | 2/2002 | Binder et al. | 435/106 |
| 2002/0077412 | A1 | * | 6/2002 | Kobayashi et al. | 524/588 |

FOREIGN PATENT DOCUMENTS

| DE | 1 163 784 | 2/1964 |
| EP | 0 637 616 A1 | 2/1995 |
| EP | 0 672 731 A1 | 9/1995 |
| EP | 0 808 880 A2 | 11/1997 |

OTHER PUBLICATIONS

English machine translation of Ettlinger et al., EP 0672731, 1995.*
Ullmanns Encyklopaedie der technischen Chemie, 4$^{th}$ Edition, 1982, vol. 21, pp. 462-463, Verlag Chemie GmbH, Weinheim, Germany.
Winnacker, Prof. Dr. Karl et al., Chemische Technologie, 4$^{th}$ Edition, 1983, vol. 3, pp. 77-84, Carl Hanser Verlag, Munich, Germany.

* cited by examiner

*Primary Examiner* — Mark Eashoo
*Assistant Examiner* — Peter F Godenschwager
(74) *Attorney, Agent, or Firm* — Smith, Gambrell & Russell, LLP

(57) ABSTRACT

Pulverulent materials which contain surface-modified and structure-modified pyrogenically prepared metalloid or metallic oxide for the purposes of improvement.

11 Claims, No Drawings

PULVERULENT MATERIALS

INTRODUCTION AND BACKGROUND

The present invention relates to pulverulent materials, to mixtures thereof, and to the use of surface- and structure-modified pyrogenically prepared metalloid or metallic oxides as flow regulators.

Pulverulent materials or their mixtures have a tendency to caking during prolonged storage.

It is known to add flow improvers or anticaking agents to pulverulent materials.

Known flow improvers are pyrogenic or precipitated, hydrophobic or hydrophilic silicas, silicates or metallic oxides. Pyrogenic silicas have higher purity compared with products prepared by precipitation. Particularly effective flow regulators (=synonymous with flow improvers or anticaking agents) are hydrophobic pyrogenic silicas, which are prepared by after-treatment of pyrogenic silicas with, for example, alkylsilanes or silicone oils. Known examples are AEROSIL R972, AEROSIL R974, AEROSIL R812 and AEROSIL R202 (manufactured by Degussa AG).

Those known flow improvers and anticaking agents have the disadvantage that they do not always adequately improve the flowability. In addition, they are difficult to incorporate because they have a tendency to form agglomerates.

If, for example, it is desired to use pyrogenic silicas as flow regulators, it is necessary to ensure that the agglomerates are comminuted mechanically to such an extent that the silica can develop its full effectiveness. This can be achieved by the following measures, for example:
- sieving the silica or the metallic oxide before it is mixed with one or more pulverulent materials,
- preparing a pre-mix of the pulverulent material and the silica or metallic oxide, which is then sieved,
- long mixing times and/or
- the use of mixing devices which exert sufficiently high shear energy to adequately comminute the agglomerates of the silica or of the metallic oxide.

That known process for the preparation of mixtures of pulverulent materials containing pyrogenic silicas or metallic oxides as flow regulators is accordingly relatively intensive in terms of time and energy. In addition, suitable devices, such as, for example, sieving machines or mixers, must be present.

SUMMARY OF THE INVENTION

The object of the present invention is to prepare pulverulent materials and mixtures thereof which do not have the disadvantages mentioned above, and to provide pyrogenic silicas and metallic oxides as flow regulators and anticaking agents in solids.

The invention provides pulverulent materials, and mixtures thereof, which are characterised in that they contain one or more pyrogenically prepared surface-modified and structure-modified metalloid or metallic oxides.

The invention also provides a method of improving the flowability of pulverulent materials and mixtures thereof, which method is characterised in that there are added to the pulverulent materials, or mixtures thereof, one or more pyrogenically prepared surface-modified, structure-modified metalloid or metallic oxides.

The invention relates also to the use of pyrogenically prepared surface-modified and structure-modified metalloid or metallic oxide for improving the flowability of pulverulent materials, pulverulent solids and mixtures thereof.

The pulverulent materials may consist of a single material or they may contain a mixture of various materials.

It has been found, surprisingly, that surface- and structure-modified pyrogenically prepared metalloid or metallic oxides are effective flow regulators and anticaking agents. They are easier to process and produce better flow behaviour than conventional pyrogenic silicas and metallic oxides.

DETAILED DESCRIPTION OF THE INVENTION

According to the invention, the following pyrogenically prepared surface-modified and structure-modified metalloid or metallic oxides can be used:

(1) Silanised structure-modified silicas, which are characterised by groups attached to the surface, the groups being alkylsilyl ($SiC_nH_{2n+1}$, where n=from 2 to 18), preferably octylsilyl and/or hexadecylsilyl, having the following physicochemical data:

BET surface area $m^2/g$: 25-400 average primary particle size nm: 5-50 pH value: 3-10 carbon content %: 0.1-25

DBP number %: The DBP number is at least 10% smaller than the DBP number of the corresponding silanised silica without structure modification. With very pronounced structure modification, the structure may be so degraded that the DBP number can no longer be determined.

As the pyrogenically prepared silica used as the starting silica, a silica prepared by high-temperature hydrolysis from $SiCl_4+H_2$ and $O_2$ may be used.

A silica prepared by high-temperature hydrolysis and having the following physicochemical data may especially be used.

TABLE 1

| | | AEROSIL 90 | AEROSIL 130 | AEROSIL 150 | AEROSIL 200 | AEROSIL 300 | AEROSIL 380 | AEROSIL OX 50 | AEROSIL TT 600 |
|---|---|---|---|---|---|---|---|---|---|
| Behaviour towards water | | | | | hydrophilic | | | | |
| Appearance | | | | | loose white powder | | | | |
| BET surface area[1] | $m^2/g$ | 90 ± 15 | 130 ± 25 | 150 ± 15 | 200 ± 25 | 300 ± 30 | 380 ± 30 | 50 ± 15 | 200 ± 50 |
| Average primary particle size | nm | 20 | 16 | 14 | 12 | 7 | 7 | 40 | 40 |
| Tamped density[2] | | | | | | | | | |
| normal product g/l | | ca. 80 | ca. 50 | ca. 50 | ca. 50 | ca. 50 | ca. 50 | ca. 130 | ca. 60 |
| compressed product g/l (addition of "V") | | — | ca. 120 | ca. 120 | ca. 120 | ca. 120 | ca. 120 | — | — |

TABLE 1-continued

|  |  | AEROSIL 90 | AEROSIL 130 | AEROSIL 150 | AEROSIL 200 | AEROSIL 300 | AEROSIL 380 | AEROSIL OX 50 | AEROSIL TT 600 |
|---|---|---|---|---|---|---|---|---|---|
| Loss on drying[3]) (2 hours at 1000° C.) on leaving the supplier | % | <1.0 | <1.5 | <0.5[9]) | <1.5 | <1.5 | <1.5 | <1.5 | <2.5 |
| Ignition loss[4])[7]) (2 hours at 1000° C.) | % | <1 | <1 | <1 | <1 | <2 | <2.5 | <1 | <2.5 |
| pH value[5]) (in 4% aqueous dispersion) |  | 3.6–4.5 | 3.6–4.3 | 3.6–4.3 | 3.6–4.3 | 3.6–4.3 | 3.6–4.3 | 3.8–4.8 | 3.6–4.5 |
| $SiO_2$[8]) | % | >99.8 | >99.8 | >99.8 | >99.8 | >99.8 | >99.8 | >99.8 | >99.8 |
| $Al_2O_3$[8]) | % | <0.05 | <0.05 | <0.05 | <0.05 | <0.05 | <0.05 | <0.08 | <0.05 |
| $Fe_2O_3$[8]) | % | <0.003 | <0.003 | <0.003 | <0.003 | <0.003 | <0.003 | <0.01 | <0.003 |
| $TiO_2$[8]) | % | <0.03 | <0.03 | <0.03 | <0.03 | <0.03 | <0.03 | <0.03 | <0.03 |
| $HCl$[8])[9]) | % | <0.025 | <0.025 | <0.025 | <0.025 | <0.025 | <0.025 | <0.025 | <0.025 |
| Sieve residue[6]) (according to Mocker, 45 μm) | % | <0.05 | <0.05 | <0.05 | <0.05 | <0.05 | <0.05 | <0.2 | <0.05 |

[1])following DIN 66131
[2])following DIN ISO 787/XI, JIS K 5101/18 (not sieved)
[3])following DIN ISO 787/II, ASTM D 280, JIS K 5101/21
[4])following DIN 55 921, ASTM D 1208, JIS K 5101/23
[5])following DIN ISO 787/IX, ASTM D 1208, JIS K 5101/24
[6])following DIN ISO 787/XVIII, JIS K 5101/20
[7])based on material dried for 2 hours at 105° C.
[8])based on material ignited for 2 hours at 1000° C.
[9])HCl content is a constituent of the ignition loss Such pyrogenically prepared silicas are known. They are described, inter alia, in:

Winnacker-Küchler, Chemische Technologie, Volume 3 (1983), 4th edition, page 77 and Ullmanns Encyklopädie der technischen Chemie, 4th edition (1982), Volume 21, page 462.

The pyrogenically prepared silicas are treated with a compound from the group $(RO)_3SiC_nH_{2n+1}$, wherein n=from 2 to 18 and R=alkyl, such as, for example, methyl, ethyl or the like.

The following compounds in particular can be used:

silane I $(CH_3O)_3SiC_{16}H_{33}$ (hexadecyltrimethoxysilane)

silane II $(CH_3O)_3SiC_8H_{17}$ (octyltrimethoxysilane).

The silicas that can be used according to the invention can be prepared by placing the pyrogenically prepared silicas in a mixer, spraying them, with intensive mixing, optionally first with water and then with the compound (organosilane) from the group $(RO)_3SiC_nH_{2n+1}$, mixing for from 15 to 30 minutes and then tempering at a temperature of from 100 to 160° C. for a period of from 1 to 3 hours, followed by structure modification and/or optional milling. A further tempering operation may optionally be carried out after the structure modification and/or milling.

Structure modification can be carried out, for example, using a ball mill or a continuously operating ball mill. Milling can be carried out, for example, by means of an air-jet mill or a pinned disk mill. Tempering can be carried out batchwise, for example in a drying cabinet, or continuously, for example in a fluid or fluidised bed. Tempering can take place under protecting gas, for example nitrogen.

The water that is used can be acidified with an acid, for example hydrochloric acid, to a pH value of from 7 to 1.

The organosilane that is used can be dissolved in a solvent, such as, for example, ethanol.

Tempering can be carried out in a protecting gas atmosphere, such as, for example, under nitrogen.

The pyrogenically prepared silicas according to the invention silanised with silane I have the physicochemical data listed in Table 2 prior to structure modification:

TABLE 2

|  | Starting material | | | | | | | |
|---|---|---|---|---|---|---|---|---|
|  | A 90 | A 130 | A 150 | A 200 | A 300 | A 380 | OX 50 | TT 600 |
| Average primary particle size [nm] | 20 | 16 | 14 | 12 | 7 | 7 | 40 | 40 |
| BET surface area [m²/g] | 40–90 | 60–130 | 75–150 | 100–200 | 150–300 | 200–380 | 20–50 | 100–250 |
| Tamped density [g/l] | 40–140 | 40–140 | 40–140 | 40–140 | 40–140 | 40–140 | 40–140 | 40–140 |
| Loss on drying [%] | <2 | <2 | <2 | <2 | <2 | <2 | <2 | <2 |
| Ignition loss [%] | 0.1–10 | 0.1–10 | 0.1–10 | 0.5–15 | 0.5–20 | 0.5–25 | 0.1–10 | 0.1–20 |
| C content [%] | 0.1–10 | 0.1–10 | 0.1–10 | 0.5–15 | 0.5–20 | 0.1–25 | 0.1–10 | 0.5–20 |
| pH value | 3.5–5.5 | 3.5–5.5 | 3.5–5.5 | 3.5–5.5 | 3.5–5.5 | 3.5–5.5 | 3.5–5.5 | 3.5–5.5 |

EXAMPLES

The pyrogenically prepared silicas that are used have the physicochemical data listed in Table 1.

The following compound of the general formula $(RO)_3SiC_nH_{2n+1}$ is used as the organosilane:

$(CH_3O)_3SiC_{16}H_{33}$ (silane I)

The silica is placed in a mixer and sprayed, with intensive mixing, first with water and then with organosilane.

When the spraying is complete, mixing is carried out for a further 15 to 30 minutes, followed by tempering for from 1 to 3 hours at from 100 to 160° C. Tempering may also be carried out under protecting gas, for example nitrogen.

The individual reaction conditions can be taken from Table 3.

The physicochemical data of the resulting silanised silicas are listed in Table 4.

TABLE 3

| Example | Aerosil | Silane | Amount of silane (g/100 g Aerosil) | Amount of water (g/100 g Aerosil) | Amount of ethanol (g/100 g Aerosil) | Tempering time (h) | Tempering temperature (° C.) |
|---|---|---|---|---|---|---|---|
| 1 | A 300 | Silane I | 1 | 0 | 9 | 2 | 120 |
| 2 | A 200 | Silane I | 2.5 | 0 | 0 | 2 | 140 |
| 3 | A 200 | Silane I | 20 | 5 | 0 | 2 | 140 |
| 4 | A 200 | Silane I | 10 | 2.5 | 0 | 2 | 140 |
| 5 | A 200 | Silane I | 5 | 1.25 | 0 | 2 | 140 |
| 6 | A 200 | Silane I | 2.5 | 1.25 | 0 | 2 | 140 |

TABLE 4

| Example | pH value | Tamped density (g/l) | C content (%) | Surface area (m²/g) | Loss on drying (%) | Ignition loss (%) |
|---|---|---|---|---|---|---|
| 1 | 4.3 | 50 | 1.3 | 253 | 0.4 | 1.8 |
| 2 | 4.4 | 49 | 1.7 | 176 | 0.3 | 2.5 |
| 3 | 4.6 | 68 | 10.1 | 116 | 0.6 | 12.7 |
| 4 | 4.5 | 72 | 5.7 | 144 | 0.6 | 7.1 |
| 5 | 4.7 | 52 | 2.6 | 167 | 0.6 | 3.4 |
| 6 | 4.5 | 51 | 1.9 | 171 | 0.7 | 2.5 | a pinned disk mill. Tempering can be carried out batchwise, for example in a drying cabinet, or continuously, for example in a fluid or fluidised bed. The tempering can take place under protecting gas, for example nitrogen.

TABLE 5

Overview of the preparation of the comparison silicas and of the silicas according to the invention (Examples)

| Description | Group attached to the surface | Structure modification | Milling after structure modification | Tempering after milling |
|---|---|---|---|---|
| Comparison silica 1 | Hexadecylsilyl | No | — | — |
| Comparison silica 2 | Octylsilyl | No | — | — |
| Silicas 1 | Hexadecylsilyl | Yes | No | No |
| Silicas 2 | Octylsilyl | Yes | Yes | No |
| Silicas 3 | Hexadecylsilyl | Yes | Yes | Yes |
| Silicas 4 | Octylsilyl | Yes | No | Yes |
| Silicas 5 | Octylsilyl | Yes | Yes | No |
| Silicas 6 | Hexadecylsilyl | Yes | Yes | No |
| Silicas 7 | Hexadecylsilyl | Yes | Yes | No |
| Silicas 8 | Hexadecylsilyl | Yes | No | No |
| Silicas 9 | Octylsilyl | Yes | Yes | No |
| Silicas 10 | Octylsilyl | Yes | No | No |
| Silicas 11 | Octylsilyl | Yes | Yes | No |
| Silicas 12 | Octylsilyl | Yes | No | No |

TABLE 6

Physicochemical data of the silicas according to the invention (Examples) and of the comparison silicas

| Description | Tamped density [g/l] | Loss on drying [%] | Ignition loss [%] | pH value | C content [%] | DBP adsorption [%] | Specific surface area according to BET [m²/g] |
|---|---|---|---|---|---|---|---|
| Comparison silica 1 | 57 | 0.5 | 1.8 | 4.6 | 1.2 | 302 | 195 |
| Comparison silica 2 | 51 | 0.6 | 6.8 | 5.3 | 5.4 | 263 | 175 |
| Silicas 1 | 137 | 0.7 | 1.9 | 4.9 | 1.3 | 217 | 193 |
| Silicas 2 | 112 | 0.7 | 7.0 | 5.8 | 5.5 | 145 | 175 |
| Silicas 3 | 118 | 0.7 | 2.3 | 5.1 | 1.3 | 228 | 176 |
| Silicas 4 | 163 | 0.9 | 6.7 | 5.3 | 5.4 | 134 | 176 |
| Silicas 5 | 114 | 0.5 | 7.1 | 6.0 | 5.4 | 142 | 175 |
| Silicas 6 | 113 | 1.3 | 2.2 | 5.1 | 1.4 | 221 | 193 |
| Silicas 7 | 123 | 0.7 | 2.6 | 6.0 | 1.4 | 208 | 197 |
| Silicas 8 | 146 | 1.1 | 2.3 | 5.8 | 1.4 | 182 | 195 |
| Silicas 9 | 240 | 0.8 | 6.7 | 4.8 | 5.3 | 87 | 169 |
| Silicas 10 | 322 | 0.3 | 6.9 | 6.0 | 5.3 | not determinable | 172 |
| Silicas 11 | 204 | 0.7 | 6.4 | 5.7 | 5.4 | 101 | 173 |
| Silicas 12 | 276 | 0.3 | 6.6 | 6.6 | 5.3 | not determinable | 168 |

Preparation of the Silicas Used According to the Invention:

The silicas, which can be prepared as described in EP 0 672 731, are subsequently subjected to structure modification by mechanical action and then optionally milled in a mill. Tempering may optionally be carried out after the structure modification and/or milling.

Structure modification can be carried out, for example, using a ball mill or a continuously operating ball mill. Milling can be carried out, for example, by means of an air-jet mill or a pinned disk mill. Tempering can be carried out batchwise, for example in a drying cabinet, or continuously, for example in a fluid or fluidised bed. The tempering can take place under protecting gas, for example nitrogen.

(2) Silanised structure-modified silicas, which are characterised by groups attached to the surface, the groups being dimethylsilyl and/or monomethylsilyl, preferably dimethylsilyl, having the following physicochemical data:

BET surface area m²/g: 25-400
Average primary particle size nm: 5-50
pH value: 3-10
Carbon content %: 0.1-10
DBP number %: <200

The silica that can be used according to the invention can have a tamped density of from 100 to 280 g/l, preferably from 100 to 240 g/l.

Pyrogenic silicas are known from Winnacker-Küchler Chemische Technologie, Volume 3 (1983), 4th edition, page 77 and
Ullmanns Enzyklopädie der technischen Chemie, 4th edition (1982), Volume 21, page 462.

Pyrogenic silicas are prepared especially by flame hydrolysis of vaporisable silicon compounds, such as, for example, $SiCl_4$, or organic silicon compounds, such as trichloromethylsilane.

The invention also provides a process for the preparation of the silanised, structure-modified, pyrogenically prepared silicas according to the invention, which process is characterised in that pyrogenically prepared silica is treated in a known manner with dimethylchlorosilane and/or monomethyltrichlorosilane, the groups dimethylsilyl and/or monomethylsilyl being attached to the surface of the pyrogenic silica, subsequently subjected to structure modification and then optionally milled.

In an embodiment of the invention, tempering may be carried out following the structure modification and/or milling.

The silicas that can be used according to the invention can be prepared, for example, as follows:

The silicas, which can be prepared as described in DE 1 163 784, are subsequently subjected to structure modification by mechanical action and then optionally milled in a mill. Tempering may optionally be carried out following the structure modification and/or milling.

Structure modification can be carried out, for example, using a ball mill or a continuously operating ball mill. Milling can be carried out, for example, by means of an air-jet mill or a pinned disk mill. Tempering can be carried out batchwise, for example in a drying cabinet, or continuously, for example in a fluid or fluidised bed. Tempering can be carried out under protecting gas, for example nitrogen.

Tempering may optionally be carried out following the structure modification and/or milling.

The individual parameters for the preparation of the individual silicas are listed in Table 7, and the physicochemical parameters are listed in Table 8.

Structure modification can be carried out, for example, using a ball mill or a continuously operating ball mill. Milling can be carried out, for example, by means of an air-jet mill or a pinned disk mill. Tempering can be carried out batchwise, for example in a drying cabinet, or continuously, for example in a fluid or fluidised bed. Tempering can be carried out under protecting gas, for example nitrogen.

TABLE 7

Preparation of the silicas that can be used according to the invention

| Description | Group attached to the surface | Structure modification | Milling after structure modification | Tempering after milling |
|---|---|---|---|---|
| Silica 1 | Dimethylsilyl | Yes | No | No |
| Silica 2 | Dimethylsilyl | Yes | No | No |
| Silica 3 | Dimethylsilyl | Yes | No | No |
| Silica 4 | Dimethylsilyl | Yes | No | No |
| Silica 5 | Dimethylsilyl | Yes | Yes | No |
| Silica 6 | Dimethylsilyl | Yes | No | No |
| Silica 7 | Dimethylsilyl | Yes | Yes | No |
| Silica 8 | Dimethylsilyl | Yes | Yes | Yes |
| Silica 9 | Dimethylsilyl | Yes | Yes | Yes |
| Silica 10 | Dimethylsilyl | Yes | Yes | No |
| Silica 11 | Dimethylsilyl | Yes | Yes | No |

TABLE 8

Physicochemical data of the silicas that can be used according to the invention

| Description | Tamped density [g/l] | Loss on drying [%] | Ignition loss [%] | pH value | C content [%] | DBP adsorption [%] | Specific surface area according to BET [m²/g] |
|---|---|---|---|---|---|---|---|
| Silica 1 | 236 | 0.1 | 0.6 | 4.0 | 0.8 | 127 | 115 |
| Silica 2 | 204 | 0.1 | 0.6 | 3.9 | 0.8 | 137 | 116 |
| Silica 3 | 223 | 0.3 | 0.7 | 4.2 | 1.0 | 160 | 169 |
| Silica 4 | 186 | 0.3 | 0.7 | 4.2 | 1.1 | 152 | 171 |
| Silica 5 | 109 | 0.2 | 0.7 | 4.4 | 1.1 | 159 | 167 |
| Silica 6 | 193 | 1.2 | 0.7 | 5.2 | 1.7 | 157 | 258 |
| Silica 7 | 125 | 0.2 | 0.7 | 4.1 | 0.8 | 130 | 110 |
| Silica 8 | 108 | 0.7 | 1.3 | 5.0 | 1.7 | 156 | 257 |
| Silica 9 | 123 | 0.3 | 0.5 | 4.3 | 1.1 | 157 | 165 |
| Silica 10 | 102 | 0.7 | 1.2 | 6.2 | 1.7 | 164 | 256 |
| Silica 11 | 160 | 0.2 | 0.7 | 4.0 | 0.8 | 132 | 115 |

EXAMPLES

Preparation and Physicochemical Properties of the Silicas

Preparation of the silicas that can be used according to the invention:
The silicas, which are prepared as described in DE 1 163 784, are subsequently subjected to structure modification by mechanical action and then optionally milled in a mill.

The silicas, which can be prepared as described in EP 0 672 731 or DE 1 163 784, are subsequently subjected to structure modification by mechanical action and then optionally milled in a mill. Tempering may optionally be carried out following the structure modification and/or milling. Structure modification can be carried out, for example, using a ball mill or a continuously operating ball mill. Milling can be carried out, for example, by means of an air-jet mill or a pinned disk mill. Tempering can be carried out batchwise, for example in a drying cabinet, or continuously, for example in a fluid or fluidised bed. Tempering can be carried out under protecting gas, for example nitrogen.

(3) Low-structured pyrogenic metalloid and metallic oxides based on $SiO_2$, $Al_2O_3$, $SiO_2/AlO_3$, $TiO_2$, $ZrO_2$, as described by EP 0 637 616.
(4) Surface- and structure-modified products which are known from EP 0 808 880 A2, are already available commercially, such as, for example, AEROSIL® R 8200, AEROSIL® R 7200 (both Degussa), AEROSIL® R 972 W (Nippon Aerosil Corporation), WACKER HDK H 2000.

Surface- and structure-modified pyrogenic metalloid or metallic oxides are used according to the invention as flow improvers and anticaking agents. The way in which they act is described hereinbelow:

Materials having a low melting point, for example fats or waxes, acquire a soft surface as temperatures increase. The result is that the individual particles adhere to one another. By the addition of surface- and structure-modified pyrogenic silicas and metallic oxides, it is possible to coat the individual particles and separate them from one another. Caking of the particles is thus effectively prevented. In pharmacy (galenics), the prevention of sintering processes of pharmaceutical active ingredients, for example during pressing into tablets, also plays an important role.

Solid bridges between particles can form by recrystallisation and structure modification. In addition, during storage of mixtures of materials whose components are capable of reacting chemically with one another, reactions between those materials can occur, especially with the absorption of ambient moisture. Such reactions result in caking, which greatly reduces pourability. Providing such a mixture of materials with surface- and structure-modified pyrogenic silicas and metallic oxides prevents caking by drawing off the liquid film by suction, or by coating the particles and the spacer function associated therewith.

If a material consists of particles of different sizes, separation can readily occur because the larger particles move more rapidly than the smaller ones during transfer to a different container or during feeding. The addition of surface- and structure-modified pyrogenic silicas and metallic oxides effects coating of the particles, as a result of which a ball-bearing effect occurs. In addition, a certain standardisation of the particle size is achieved, so that separation is no longer to be feared. The shape of the particles present in a material is also of considerable importance for the pourability of materials. An uneven surface can result in increased friction and/or interlocking of the particles.

Many materials develop a film of moisture on the surface of their particles. During storage, the individual particles are in close contact. The surface tension of the liquid holds the particles together. If the material is soluble in water, recrystallisation and bridge formation may occur with variations in the atmospheric humidity. The addition of silica results in the film of moisture being drawn off by suction, the particles being surrounded completely by the silica. As a result, spatial separation occurs. If the material is hygroscopic, surface- and structure-modified pyrogenic silicas and metallic oxides are particularly effective.

In the case of pulverulent materials, VAN-DER-WAALS forces occur by the interaction of dipole moments of molecules.

In the case of non-conductive powders, an excess charge is frequently observed, which leads in the case of antipolar charging to forces of attraction. During the feeding of powders through pipes or during mixing, sieving and milling operations, that electrostatic charge always occurs. Surface- and structure-modified pyrogenic silicas and metallic oxides can reduce the electrostatic charge.

The surface- and structure-modified pyrogenic silicas and metallic oxides can be used according to the invention as flow regulators and anticaking agents in a concentration of from 0.001 to 50 wt. %, preferably from 0.01 to 10 wt. % and particularly preferably from 0.1 to 5 wt. %. The solids mixtures are prepared by mixing by means of known mixing devices. According to the invention, mixing devices that exert only low shear energy, such as, for example, gravity or ploughshare mixers, are suitable.

Depending on the field of use, the solids mixtures can be processed further in different ways, for example introduction into capsules, dispersion, granulation, compacting, dissolution, milling, mixing, pelletisation, sifting, sieving, pressing into tablets, comminution, etc.

The pulverulent materials prepared according to the invention with surface- and structure-modified pyrogenically prepared silicas and metallic oxides are distinguished by high flowability or fluidisability.

The flowability is determined by numerous factors: the properties of the starting material (for example its grain size, chemical composition such as specific weight), the concentration and method of incorporation of the flow regulator, the atmospheric humidity, the storage time.

In order to determine the flowability of the pulverulent materials, siliconised glass discharge vessels having different outlet diameters may be used.

TABLE 9

Scheme for evaluating flowability using glass discharge vessels.

| Vessel no. Rating number | Outlet width Ø mm | Evaluation with still smooth passage of the powder |
| --- | --- | --- |
| 1 | 2.5 | very good |
| 2 | 5 | good |
| 3 | 8 | on the whole good |
| 4 | 12 | adequate |
| 5 | 18 | poor |
| 6 | | unsatisfactory (does not run through no. 5) |

The height of those vessels is 90 mm, the inside diameter is 42 mm. Evaluation is made using the ratings 1=very good flow behaviour, i.e. the test powder flows without stopping from glass discharge vessel no. 1 with the smallest outlet opening, to rating 6=unsatisfactory flow behaviour, i.e. the powder does not even flow through glass discharge vessel no. 5 with the largest outlet opening. Table 9 shows discharge values and evaluation criteria. In general, the procedure is such that the powder test starts with glass discharge vessel, no. 5 and the discharge vessels having the smaller openings are then tested in succession. The glass discharge vessel from which the powder just about flows without stopping is indicated.

A further method is measurement of the cone height of a powder. A metal sieve is secured at a distance of from 30 to 100 mm above a solid metal cylinder having a diameter of 50 mm and a height of about 80 mm. The distance between the metal sieve and the metal cylinder is governed by the flowability of the powder to be measured and should be slightly greater than the cone height of the powder of the test series to be tested that has the poorest pouring behaviour. The powder is shaken onto the sieve and slowly pressed through the sieve by hand with the aid of a plastics spatula. The powder that falls through forms a cone on the metal cylinder. Powder is passed through the sieve until a cone of geometrically uniform shape has formed on the cylinder. The sieve is then removed and the height of the cone is measured. From the height of the cone and the diameter of the metal cylinder it is possible to calculate the gradient of slope of the tested powder. Because the diameter of the cone is constant, the height of the cone can also be used as a direct measure of the pourability. Experience hitherto has shown that powders having cone heights of from 15 to 20 mm can be termed very readily pourable. Products having cone heights of from 50 to 70 mm have poor pouring behaviour. The values listed in Table 10 below are appropriate if value analysis is to be carried out according to different criteria or measuring methods.

TABLE 10

| Cone height mm | Assessment Description | Rating |
|---|---|---|
| <20 | very good | 1 |
| 21–30 | good | 2 |
| 31–40 | on the whole good | 3 |
| 41–50 | adequate | 4 |
| 51–60 | poor | 5 |
| >60 | unsatisfactory | 6 |

The pulverulent materials according to the invention can be used in numerous applications and sectors, such as, for example, cosmetics, agriculture, foodstuffs, food supplements, pharmacy, animal feeds, etc. . . .

There are listed hereinbelow examples of pulverulent materials which can be provided according to the invention with the surface- and structure-modified metalloid or metallic oxides as flow regulators:

covering powders, aminosulfonic acid, inorganic salts, aspirin, bath salts, brewer's yeast powder, lead oxides, lead and titanium dioxide, Carbowax 6000, cattle dust, cellulose powder, chilli powder, choline chloride powder, dragée production, fertilisers, egg powder (from egg yolk), egg powder (whole egg), iron sulfate heptahydrate, fat concentrates, fire-extinguishing powders, fish food, feeds, spice mixtures, foundry auxiliaries, gypsum, guar gum, urea (cryst.), urea (prilled), domestic fertilisers, hexamethylenetetramine, HVP (hydrolized vegetable powders), industrial salts, instant drink powders, coffee powder, coffee whiteners, cocoa powder, potato starch, cheese (grated cheese), cheese powder (parmesan), adhesive powders, garlic powder, cooking salt, cosm. covering powders, plastics films, skimmed milk powder, corn starch, malt powder, molasses, melamine resin powder, methionine, milk substitute, milk powder, mineral mixtures, whey powder, monoammonium phosphate, sodium hydrogen carbonate, sodium hydrogen sulfate, sodium perborate, sodium propionate, sheets of paper, paprika powder, pesticides, plant-protecting granules, plant-protecting dusts, polyethylene powder, powdered sugar, pigments, pickling salt, polymers, proxyphylline, powder, powdered rubber, powder coatings, PVC powders, rice starch, roast sugar, inorganic salts in general, scouring powders, sulfur, soap powders, silver halides, sintered metal powders, table salt, disintegrators, wettable powders (plant protection), fruit powders, trace element pre-mixes, S-PVC powders, soup powders, tomato powders, toners, toilet cleaners, powder type fire extinguishers, vitamin pre-mixes, detergents, anhydrous citric acid, fluidised sintered powders, zirconium oxide, citrus powder, onion powder, sugars.

An example of a pulverulent material according to the invention and the use according to the invention of the surface-modified and structure-modified pyrogenically prepared metalloid and metallic oxides is the improvement to the fluidisability of fire-extinguishing powders. Fire-extinguishing powders should be readily fluidisable even after a prolonged storage period and must not cake so that, in the event of a fire, problem-free spraying from the extinguisher is ensured. To that end, small amounts of a flow improver are added thereto according to the prior art. Such a flow improver may be, for example, conventional pyrogenic or precipitated, hydrophobic or hydrophilic silicas, silicates or special oxides. The best results according to the prior art are achieved with hydrophobic pyrogenic silicas such as, for example, Aerosil® R972. Nevertheless, the fluidisability achieved therewith is still not sufficient.

Surprisingly, the use of the structure-modified aerosils according to the invention led to a marked improvement in the fluidisability and a marked reduction in the tendency to caking compared with the prior art.

TABLE 11

Overview of the preparation of the comparison silicas and of the silicas that can be used according to the invention

| Description | Group attached to the surface | Structure modification | Milling after structure modification | Tempering after milling |
|---|---|---|---|---|
| Example 1 R 974 | Dimethylsilyl | Yes | No | No |
| Example 2 R 974 | Dimethylsilyl | Yes | Yes | No |
| Example 3 R 974 | Dimethylsilyl | Yes | Yes | Yes |
| Example 4 R 972 | Dimethylsilyl | Yes | No | No |
| Example 5 R 972 | Dimethylsilyl | Yes | Yes | No |

The physicochemical data of the silicas are listed in Table 12.

TABLE 12

| Description | Tamped density [g/l] | Loss on drying [%] | Ignition loss [%] | pH value | C content [%] | DBP adsorption [%] | Specific surface area according to BET [m$^2$/g] |
|---|---|---|---|---|---|---|---|
| Aerosil R 972 (comparison silica) | 64 | 0.1 | 0.5 | 4.0 | 0.8 | 243 | 113 |
| Aerosil R 973 (comparison silica) | 67 | 0.5 | 0.6 | 4.8 | 1.0 | 256 | 165 |
| Aerosil 200 (comparison silica) | 56 | 1.1 | 0.4 | 4.0 | 0 | nd | 206 |
| Aerosil R 972 W (according to the invention) | | | | 4.38 | 0.78 | | 108 |

TABLE 12-continued

| Description | Tamped density [g/l] | Loss on drying [%] | Ignition loss [%] | pH value | C content [%] | DBP adsorption [%] | Specific surface area according to BET [m²/g] |
|---|---|---|---|---|---|---|---|
| Example 1 (according to the invention) | 186 | 0.3 | 0.7 | 4.2 | 1.1 | 152 | 171 |
| Example 2 (according to the invention) | 109 | 0.2 | 0.7 | 4.4 | 1.1 | 159 | 167 |
| Example 3 (according to the invention) | 123 | 0.3 | 0.5 | 4.3 | 1.1 | 157 | 165 |
| Example 4 (according to the invention) | 204 | 0.1 | 0.6 | 3.9 | 0.8 | 137 | 116 |
| Example 5 (according to the invention) | 125 | 0.2 | 0.7 | 4.1 | 0.8 | 130 | 110 |
| Aerosil R 7200 (according to the invention) | 258 | 0.8 | 8.1 | 4.4 | 5.0 | nd | 155 |
| Aerosil R 8200 (according to the invention) | 175 | 0.3 | 3.2 | 5.7 | 3.1 | nd | 161 |

Fire-Extinguishing Powder (Preparation of the Samples)

495 g of the fire-extinguishing powder and 5 g of the silica are weighed into a 1000 ml screw-top jar and the cover is closed. The materials are mixed for 30 minutes at moderate speed using a Turbula mixer.

The fluidisability of a fire-extinguishing powder is measured by means of a fluidising apparatus consisting of two 750 ml Erlenmeyer flasks which are connected together. To that end, 500 g of extinguishing powder mixture (fire-extinguishing agent based on ammonium salts and mineral additives) are weighed into one of the Erlenmeyer flasks, and the second Erlenmeyer flask is fastened to the first by means of a sealing ring and a connecting sleeve. The apparatus, which resembles an hour-glass, is clamped in a rotatable holder on a stand, and the powder is allowed to settle for 30 minutes. The apparatus is then rotated through 180° so that the extinguishing powder flows from one flask into the other. As soon as the extinguishing powder has flowed out of one flask, it is again rotated through 180°. 30 passes are carried out in immediate succession, and the time at 10, 20 and 30 passes is determined.

The time for 10, 20 and 30 passes is recorded and the differences in the times are calculated according to the calculation below. The times for the first 10, the second 10 and the third 10 passes are thus determined. Shorter times mean better fluidisability.

$t_1$=time for 10 passes
$t_2$=time for 20 passes
$t_3$=time for 30 passes
$\Delta t_1 = t_1$=time for the first 10 passes
$\Delta t_2 = t_2 - t_1$=time for the second 10 passes
$\Delta t_3 = t_3 - t_2$=time for the third 10 passes

TABLE 13

| Example | Type of modification | $t_1$ [s] | $t_2$ [s] | $t_3$ [s] | $\Delta t_1$ [s] | $\Delta t_2$ [s] | $\Delta t_3$ [s] |
|---|---|---|---|---|---|---|---|
| Aerosil R974 | None | 350 | 703 | 1040 | 350 | 353 | 337 |
| 1 | Structure modification | 343 | 407 | 476 | 343 | 64 | 69 |
| 2 | Structure modification and milling | 319 | 405 | 480 | 319 | 86 | 75 |
| 3 | Structure modification, milling and tempering | 197 | 265 | 333 | 197 | 68 | 68 |

Table 13 shows the fluidisability of fire-extinguishing powders. Shorter times mean an improvement in the fluidisability.

A markedly improved fluidisability of the fire-extinguishing powder compared with the prior art is found with structure-modified aerosils, especially after more than 10 passes.

Determination of the Tendency to Caking

Test Method 1

The tendency to caking is tested by placing 50.0 g of test material into a 100 ml glass beaker and placing the beaker in a 600 ml glass beaker containing a layer of water of about 2 cm. The glass beaker is closed tightly with aluminium foil and stored in a drying cabinet for 15 hours at 80° C. The 100 ml glass beaker is then removed from the 600 ml glass beaker and the test material is dried for 15 hours at 80° C. The sample is then sieved manually through a 0.5 mm sieve and the residue is determined; the smaller the residue, the better the prevention of caking. The appearance of the sample is also assessed.

TABLE 14

Determination of the tendency of fire-extinguishing powders to caking

| Example | Type of modification | Sieve residue [g] | Visual assessment |
|---|---|---|---|
| Aerosil R974 | None | 51.0 | Slightly moist, very pronounced caking, many agglomerates, phosphate fusion occurs |
| 2 | Structure modification and milling | 6.8 | Still as dry, disintegrates to the original degree of dispersion when rolled and shaken, many agglomerates, no phosphate fusion occurs |
| 3 | Structure modification, milling and tempering | 9.2 | Still as dry, disintegrates to the original degree of dispersion when rolled and shaken, many agglomerates, no phosphate fusion occurs |

Test Method 2

20.0 g of sample material are introduced into a Petri dish having a diameter of 5 cm, and the dish is stored in a desiccator over saturated ammonium sulfate solution for 24 hours at room temperature and 80% atmospheric humidity. The appearance of the powder is then assessed.

TABLE 15

Determination of the tendency of fire-extinguishing powders to caking

| Example | Type of modification | Sieve residue [g] | Visual assessment |
|---|---|---|---|
| Aerosil R 974 | None | 51.0 | Slightly moist, very pronounced caking, many agglomerates, phosphate fusion occurs |
| 2 | Structure modification and milling | 6.8 | Still as dry, disintegrates to the original degree of dispersion when rolled and shaken, many agglomerates, no phosphate fusion occurs |
| 3 | Structure modification, milling and tempering | 9.2 | Still as dry, disintegrates to the original degree of dispersion when rolled and shaken, many agglomerates, no phosphate fusion occurs |

TABLE 16

Tendency of fire-extinguishing powders to caking (test method 2)

| Example | Type of modification | Visual assessment |
|---|---|---|
| Aerosil R 974 | None | Moist, few agglomerates, the original degree of dispersion is not achieved when shaken, no phosphate fusion occurs |
| 2 | Structure modification and milling | Slightly moist, no agglomerates, disintegrates to the original degree of dispersion when rolled and shaken, no phosphate fusion occurs |
| 3 | Structure modification, milling and tempering | Slightly moist, no agglomerates, disintegrates to the original degree of dispersion when rolled and shaken, no phosphate fusion occurs |

According to both test methods, there is a markedly reduced tendency to caking compared with the prior art when fire-extinguishing powders are provided with the structure-modified aerosils used according to the invention.

Example 2

Pharmaceutical Excipient Mixtures

Determination of the agglomerate content and the flowability of mixtures with microcrystalline cellulose for pharmaceutical applications 198.0 g of Avicel PH101 and in each case 2.0 g of silica and the products from the Examples were pre-mixed manually in 1 l wide-necked flasks. The powder mixtures were then transferred to a set of sieves (stainless steel) consisting of two sieves having mesh widths of 0.71 mm (upper) and 0.315 mm (lower) and a closed sieve bottom. The mixtures were sieved, by manual shaking, until the amount of solid on the two sieves did not decrease further. The two sieves and the sieve bottom, whose empty weights had first been determined, were then weighed in order to determine the amount of silica agglomerates which were too coarse to pass through the 0.71 mm or 0.315 mm sieve. The three sieved fractions of a mixture were then again combined in the 1 l three-necked flask and mixed in a gravity mixer (Turbula) for 5 minutes at 42 revolutions per minute. The flow rating and the cone height of the mixture were then determined, before the content of the sieved fractions was again determined as described above. The fractions were again combined and mixed for a further 55 minutes. The flow rating, the cone height and the amount of the sieved fractions were again determined.

The results of the tests are summarised in Table 0.17 below.

TABLE 17

| | | Comparison examples | | Examples Aerosil | | |
|---|---|---|---|---|---|---|
| Mixing time | | Aerosil 200 | Aerosil R972 | R 972W (NAC) | Example 4 | Example 5 |
| 0 min | Sieve residue 0 min 0.71 mm | 64.0% | 46.0% | 0 | 0 | 5.5% |
| | Sieve residue 0 min 0.315 mm | 32.5% | 20.5% | 1.0% | 8.0% | 9.5% |
| | Sieve residue 0 min Total | 96.5% | 66.5% | 1.0% | 8.0% | 15.0% |
| 5 min | Sieve residue 5 min 0.71 mm | 58.5% | 39.5% | 0 | 4.5% | 10.0% |
| | Sieve residue 5 min 0.315 mm | 28.0% | 18.0% | 1.5% | 10.5 | 16.5% |
| | Sieve residue 5 min Total | 86.5 | 57.5% | 1.5% | 15.0% | 26.5% |
| | Flow rating | 6 | 4 | 3 | 2 | 3 |
| | Cone height (cm) | 2.5 | 2.0 | 1.75 | 1.9 | 1.9 |
| 60 min | Sieve residue 60 min 0.71 mm | 33.5% | 32.0% | 0 | 4.5% | 2.5% |
| | Sieve residue 60 min 0.315 mm | 15.0% | 18.0% | 1.5% | 12.0% | 8.5% |
| | Sieve residue 60 min Total | 48.5% | 50.0% | 1.5% | 15.5% | 11.0% |

TABLE 17-continued

|  | | Flow rating | 4.5 | 3.5 | 2 | 2 | 2.5 |
|---|---|---|---|---|---|---|---|
|  | | Cone height | 2.3 | 1.9 | 1.95 | 1.9 | 1.9 |

| | | Examples | | | | |
|---|---|---|---|---|---|---|
| Mixing time | | Example 9 | Example 2 | Example 7 | Aerosil R7200 | Aerosil R8200 |
| 0 min | Sieve residue 0.71 mm | 10.5% | 1.0% | 4.5% | 0.05% | 14.0% |
| | Sieve residue 0.315 mm | 12.5% | 7.0% | 4.5% | 3.0% | 15.0% |
| | Sieve residue Total | 23.0% | 8.0% | 9.0% | 3.5% | 29.0% |
| 5 min | Sieve residue 0.71 mm | 10.5% | 6.0% | 5.5% | 2.0% | 12.5% |
| | Sieve residue 0.315 mm | 15.0% | 5.0% | 5.5% | 2.0% | 16.5% |
| | Sieve residue Total | 25.5% | 11.0% | 11.0% | 4.0% | 29.0% |
| | Flow rating | 3 | 3 | 3 | 4 | 2 |
| | Cone height (cm) | 1.95 | 1.85 | 1.9 | 1.9 | 1.8 |
| 60 min | Sieve residue 0.71 mm | 5.0% | 1.0% | 0.0% | 1.0% | 1.0% |
| | Sieve residue 0.315 mm | 8.0% | 2.0% | 5.0% | 1.5% | 1.5% |
| | Sieve residue Total | 13.0% | 3.0% | 5.0% | 2.5% | 2.5% |
| | Flow rating | 3 | 3 | 4 | 3 | 1 |
| | Cone height | 1.85 | 2 | 1.9 | 1.9 | 1.8 |

The tests clearly show that the powder mixtures according to the invention containing the surface- and structure-modified pyrogenic silicas Aerosil R 972 W, the products of the Examples and Aerosil 200 and Aerosil 972 have a markedly smaller sieve residue and hence agglomerate content than the comparison products Aerosil 200 and Aerosil R 972. In addition, the maximum flowability is achieved after a mixing time of only 5 minutes whereas, when AEROSIL 200 and AEROSIL R 972 are used, the maximum flowability achievable with those materials is reached only after 60 minutes.

The invention claimed is:

1. Pulverulent materials and mixtures thereof, comprising one or more modified pyrogenically prepared metalloid or metallic oxides having a surface modification and a structure modification wherein the modified pyrogenically prepared metalloid or metallic oxide is
   a silanized silica having alkylsilyl groups which are octylsilyl and/or hexadecylsilyl attached to said silica, and having the following physiochemical properties:

| | |
|---|---|
| BET surface area | 25-400 m$^2$/g |
| Average primary particle size | 5-50 nm |
| pH value | 3-10 |
| Carbon content | 0.1-25% |
| DBP number % | <200%. |

2. The pulverulent materials and mixtures of claim 1, wherein the surface modification is a chemical modification of the surface of the pyrogenically prepared metalloid or metallic oxide and the structure modification is a physical modification of the physical structure of the pyrogenically prepared metalloid or metallic oxide.

3. The pulverulent materials and mixtures of claim 2, wherein the physical modification is the result of mechanical action.

4. The pulverulent materials and mixtures of claim 1, wherein the pyrogenically prepared metalloid or metallic oxide having the structure modification has a DBP number % which is smaller than a pyrogenically prepared metalloid or metallic oxide particle that lacks a structure modification.

5. The pulverulent materials and mixtures of claim 4, wherein the DBP number is at least 10% smaller than the DBP number % of the pyrogenically prepared metalloid or metallic oxide particle that lacks a structure modification.

6. Method of improving the flowability of pulverulent materials and mixtures thereof, comprising adding to the pulverulent materials and mixtures thereof one or more surface-modified and structure-modified pyrogenically prepared metalloid or metallic oxides wherein the surface-modified and structure-modified pyrogenically prepared metalloid or metallic oxide is
   a silanized structure-modified silica having alkylsilyl groups which are octylsilyl and/or hexadecylsilyl attached to said silica, and having the following physiochemical properties:

| | |
|---|---|
| BET surface area | 25-400 m$^2$/g |
| Average primary particle size | 5-50 nm |
| pH value | 3-10 |
| Carbon content | 0.1-25% |
| DBP number % | <200%. |

7. A composition of matter comprising at least one pulverulent material which is a fire-extinguishing powder and at least one surface-modified pyrogenically prepared metalloid or metallic oxide wherein the surface-modified and structure-modified pyrogenically prepared metalloid or metallic oxide is
a silanized structure-modified silica having alkylsilyl groups which are octylsilyl and/or hexadecylsilyl attached to said silica, and having the following physiochemical properties:

| | |
|---|---|
| BET surface area | 25-400 m²/g |
| Average primary particle size | 5-50 nm |
| pH value | 3-10 |
| Carbon content | 0.1-25% |
| DBP number % | <200%. |

8. Pulverulent materials and mixtures thereof, comprising one or more silanized silica having alkylsilyl groups which are octylsilyl and/or hexadecylsilyl attached to said silica, and having the following physiochemical properties:

| | |
|---|---|
| BET surface area | 25-400 m²/g |
| Average primary particle size | 5-50 nm |
| pH value | 3-10 |
| Carbon content | 0.1-25% |
| DBP number % | <200%. |

9. The pulverulent materials and mixtures of claim 8, wherein the silanized silica has been mechanically modified to result in the DBP number % of <200% which is at least 10% smaller than corresponding silanized silica which has not been mechanically modified.

10. A method of improving the flowability of a pulverulent material which comprises adding the pulverulent materials and mixtures thereof in accordance with claim 8.

11. A mixture which comprises a fire-extinguishing powder and the pulverulent materials and mixtures in accordance with claim 8.

\* \* \* \* \*